Aug. 15, 1967  C. E. LE ROY  3,336,513
SEALED CASING FOR ELECTRICAL DEVICE WITH INSULATED LEAD
Filed Dec. 21, 1964  2 Sheets-Sheet 1

INVENTOR.
Chester E. Le Roy
By Dressler, Goldsmith, Clement, Gordon & Ladd
ATTORNEYS.

Aug. 15, 1967   C. E. LE ROY   3,336,513
SEALED CASING FOR ELECTRICAL DEVICE WITH INSULATED LEAD
Filed Dec. 21, 1964   2 Sheets-Sheet 2
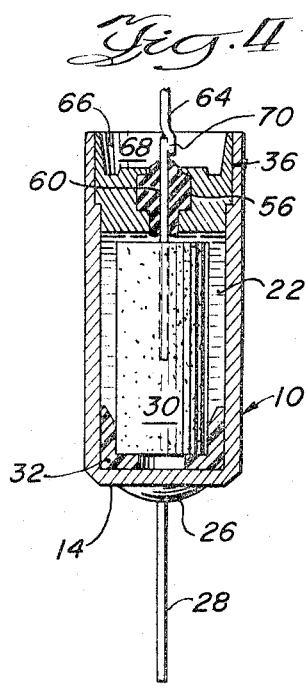
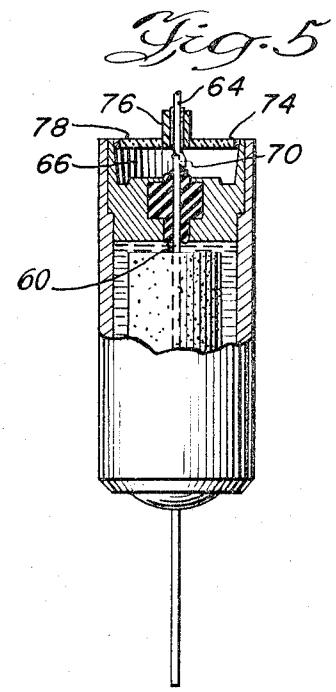
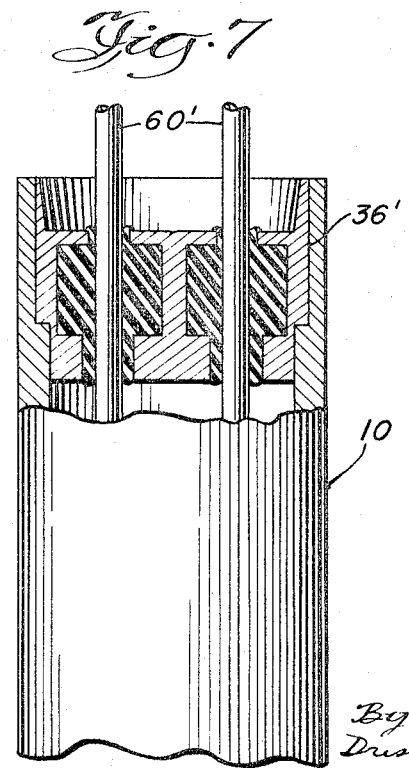
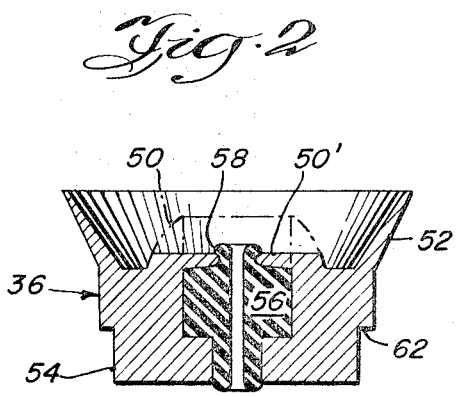
INVENTOR.
Chester E. LeRoy
By Dressler, Goldsmith, Clement, Gordon & Ladd
ATTORNEYS.

United States Patent Office 3,336,513
Patented Aug. 15, 1967

3,336,513
SEALED CASING FOR ELECTRICAL DEVICE
WITH INSULATED LEAD
Chester E. Le Roy, Waukegan, Ill., assignor to Fansteel
Metallurgical Corporation, a corporation of New York
Filed Dec. 21, 1964, Ser. No. 419,856
5 Claims. (Cl. 317—230)

ABSTRACT OF THE DISCLOSURE

The invention relates to a seal structure for an encased electrical device with a lead projecting through a compressed insulative plug disposed within a closure disk integrally sealed to the casing.

---

This invention relates to sealed electrical devices and more particularly to a seal and method for sealing electrolytic capacitors.

Since electrical circuits utilizing miniature components continue to employ electrolytic capacitors, any reduction in the size of such capacitors is highly desirable. One of the major obstacles in any such size reduction has been the provision of an adequate seal. Some existing structures for sealing such devices which may perform satisfactorily are larger than the remaining portion of the capacitors they seal. One such seal structure, for example, is disclosed in the United States Patent No. 2,744,217, which not only discloses a capacitor having the aforementioned enlarged configuration, but also exemplifies the relatively complex configuration of the existing seal structures.

These devices along with others that do not have an enlarged seal portion make extensive use of gaskets or similar plastic materials, all of which are adversely affected by wide ranges of temperature, and in particular, by cold temperatures. As a result, the effectiveness and reliability of such structures is limited after extended operations under such conditions.

The importance of a good seal for ambient atmosphere sensitive electrical devices, such as electrolytic capacitors, cannot be overemphasized. For example, sulfuric acid, or similar chemical solutions contained within such devices have a natural tendency to creep. In addition, operation of the device is often accompanied by an increase in the temperature of the solution which results in the acid becoming chemically more active. An increase in internal pressure also may result from rising temperatures, thereby increasing any tendency of the acid to creep. A seal is also important for dry electrolytic capacitors because of their sensitivity to changes in humidity. Since electrolytic capacitors are initially provided with a relatively small amount of acid solution, it is apparent that the loss of any of the solution can result in changes in the electrical characteristics of the device which may be sufficient to cause changes in the parameters of the circuit in which the device is used, or to cause internal damage to the device itself because of the increased concentration of the solution. In addition, acid leaking through an imperfect seal can corrode the external components of the device and other associated or adjacent elements in the circuit.

By the present invention, there is provided an improved seal, while being of simple configuration, insures effective and positive sealing of ambient atmosphere sensitive electrical devices, such as, for example, electrolytic capacitors. Not only is the sealing structure of the present invention of small physical dimensions, thereby allowing construction of miniaturized capacitors, but the higher proportion of metal used provides increased cathode area not previously possible. The resultant reduction in the amount of gasket material also provides a structure that is able to function as desired during extended operations over wide variations of temperatures ranging at least from —60° C. to 175° C. Furthermore, by the present invention there is provided a simplified method for sealing ambient atmosphere sensitive electrical devices, in which a portion of the seal structure is assembled as a dry seal away from the presence of any contaminant.

In general, the improved seal of the present invention includes a simplified structure which is easily assembled for permanently sealing such electrical devices. The structure includes a disk having a bonding surface at its perimeter and also having an aperture passing therethrough. A hollow plug force fitted into the aperture provides a seal for the aperture completed by a lead force fitted through the plug.

In one disclosed embodiment, the seal structure, including the disk and the plug, closes a casing having a portion defining an opening. The outer edge of the disk, which is located within the opening, is welded to the casing. A lead extending into the casing is force fitted through the plug to complete the seal for the casing.

More specifically, the method for sealing such electrical devices includes the steps of force fitting the deformable plug into an aperture located in the disk, force fitting a lead through the plug, placing the disk, plug and lead into the opening of the casing into which the lead extends, and welding the periphery of the disk to the housing to provide a seal for the housing.

While the present invention will be described with reference to electrolytic capacitors, and primarily with respect to wet electrolytic capacitors utilizing tantalum pellet anodes, it is apparent that other type capacitors, such as, for example, dry electrolytic capacitors and foil capacitors, can also utilize the present invention. In addition, it should be understood that the seal structure and method is not limited to capacitors, but is useful for sealing similarly constructed ambient atmosphere sensitive electrical devices requiring seals. Such devices include, for example, those which contain liquid which can evaporate, those which generate gas which should not be permitted to escape, or those which are sensitive to changes in ambient temperature pressure or humidity.

Capacitors embodying the present invention are shown in the accompanying drawings incorporated herein as a part of this specification, and in which:

FIG. 2 is an enlarged sectional view showing part of the seal structure in which the deformable plug is compressed into the aperture of the disk;

FIG. 4 is a full section view of one embodiment of the present invention assembled;

FIG. 5 is a sectional view of a modified embodiment of the invention; and

FIGS. 6 and 7 show two further embodiments of the present invention.

Figure 1:
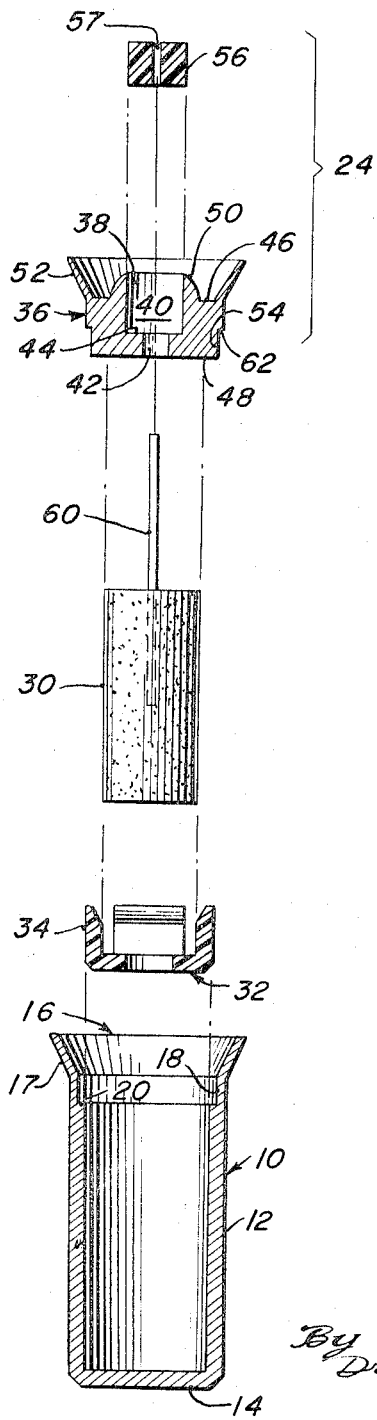
FIGURE 1 is an exploded view in section showing the relationship of the various components of one embodiment of the present invention prior to assembly.
Figure 3:
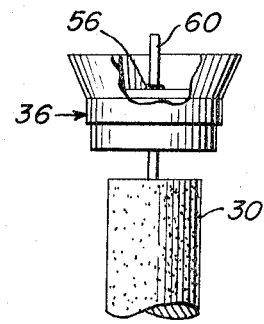
FIG. 3 is a partially cut away view of the structure of FIG. 2 with a lead inserted through the compressed plug.

The seal structure best illustrated in FIGURES 1–4 of the drawings is shown in relation to capacitors provided with a housing which is, for example, a cup-shaped metallic casing 10 typically having a cylindrically shaped side wall 12, a circular bottom 14 and an opening 16 at its upper end. A lip 17, prior to assembly of the capacitor, extends upwardly from the upper portion 18 of the side wall adjacent to the opening 16 which portion is thinner than the remainder of the wall because of its enlarged inner diameter which forms a shoulder 20 on the inner surface of the wall 12.

Since a solution of sulfuric acid is often used as the electrolyte 22 contained within the casing 10, the casing 10 is preferably composed of a metal which does not react with the component parts of the seal structure 24 or with the electrolyte 22. The casing 10 may be formed, for example, from silver, since silver, when used as an electrode in an electrolytic capacitor does not form an insulating surface film in the presence of the electrolyte. Additionally, silver's excellent heat and electrical conductivity renders it quite suitable for use as an electrode. Silver also has the advantage of being readily etched to provide increased surface area and, in addition, will accept porous platinum plating to further increase surface area. The silver casing 10, which in an electrolytic capacitor acts as the cathode, is provided with an external connection 26 by soldering or otherwise electrically and mechanically fastening a cathode lead 28 to the bottom 14 of the casing 10.

Another electrode 30, the anode, which may be, for example, a pellet of porous tantalum metal with a thin film of high dielectric constant formed thereon, is disposed within the casing 10. The anode 30 is supported by a suitable insulating spacer 32 located inside the casing 10 on the bottom 14. The spacer 32 may be provided with a recess or may have upwardly extending flanges 34 for radially centering the anode 30 within the casing 10.

The opening 16 at the top of the casing 10 is closed by the seal structure 24. The structure 24 includes an annular metallic disk 36 designed to fit within the opening 16. The disk 36 is composed of a suitable material such as, for example, silver or platinum, which does not react chemically either with the electrolyte 22 or with the material of the casing 10 and does not form an electrolytic cell with the materials with which it is in contact. The upper portion 38 of the aperture 40 in the disk 36 is enlarged with respect to the lower portion or neck 42 of the aperture 40 forming a ledge 44 intermediate the upper and lower surfaces 46 and 48, respectively, of the disk 36. The upper extremity of the enlarged portion 38 of the aperture 40 is defined by an upwardly extending flange 50, part of and integral with the disk 36. Another integral flange 52 extends, prior to sealing of the casing 10, upwardly from the upper extremity of the periphery 54 of the disk 36.

A deformable and compressible plug 56 having a central passage 57 traversing it is disposed within the enlarged upper portion 38 of the aperture 40 and, prior to compression rests on the ledge 44 within the aperture. Since the plug 56 may come into contact with the electrolyte 22, and since its environment may include a wide range of temperatures, the material from which it is formed should be stable over such a wide range of temperatures while remaining inert to the electrolyte. One such substance is a copolymer of chlorotrifluoroethylene and vinylidene fluoride which has an excellent resistivity to acids, is of a resilient nature and has good sealing qualities. Such a synthetic plastic, for example, is commercially available from Minnesota Mining & Manufacturing Co. under the trademark Kel-F, elastomer.

In assembling the capacitor in accordance with the present invention, the aperture 40 in the disk 36 is sealed by directing the flange 50 defining the aperture 40 radially inwardly against the plug 56 to form horizontal tabs 50'. A portion of the plug 56 is thereby forced over the rim of the ledge 44 into the neck 42 of the aperture 40. The upper reaches of the plug 56 overlap the top of the now inwardly deformed flange tabs 50' to form a bead 58 at the top of the aperture 40. Thus the plug is deformed to have compressed and restricted top and bottom portions.

An anode lead 60, attached to the tantalum anode 30 by sintering or other suitable method, is force fitted through the compressed and deformed plug 56. The disk 36 is disposed in the opening 16 of the casing 10. The periphery 54 of the disk 36 fits tightly within the opening 16 and has a shoulder 62 which rests on the shoulder 20 of the wall 12. The periphery 54 makes contact with the inner surface of side wall 12 both above and below the shoulder 20 to provide a good electrical connection between the disk and the casing. The upwardly extending flange 52 of the disk 36 also makes flush contact with the lip 17 of the casing 10.

In the completed seal structure, the flange 52 is bonded to the lip 17 of the casing 10. The bonding may be accomplished by applying pressure to force the structure through a suitable die to cold pressure-weld the flange 52 and the lip 17 together although the welding may be accomplished in any appropriate manner. Ultrasonic energy also may be used to assist in fusing the metals together. The forcing of the structure through the die not only completes the seal, but also cuts off any excess material and aligns the welded lip and flange construction with the remainder of the casing to provide a sealed device having a cylindrical silhouette.

Because of the long interface and tight fit between the periphery of the disk 36 and its flange 52 and the inside of the casing 10 and its lip 17, examples of other bonding and welding techniques include heliarc welding, friction welding, brazing or silver soldering. These approaches for completing the seal can be used in configurations, as described herein, in which they do not contaminate the electrolyte or otherwise have detrimental effects on the capacitor.

After the casing has been sealed, as described above, the tantalum anode lead 60 is cut off at a point above the bead 58. An easily solderable external conductor 64 is welded, soldered or otherwise connected to the anode lead 60. A suitable substance 66, e.g., an epoxy resin or a plastic material, disposed in the space 68 within the flange 52 to cover the plug 36, anode lead 60 and the junction 70 between the anode lead 60 and the conductor 64. In addition to what sealing function it might have, the substance 66 acts to strengthen the seal, particularly at the junction 80. As shown in FIGURES 4 and 5 the junction 70 includes a projection. When surrounded by the substance 66 this projection adds additional strength to the junction 70 and is particularly helpful in preventing damage which might otherwise be caused, for example, by vibration or by twisting of the conductor 64.

One modification of the disclosed invention shown in FIGURE 5 is useful when the capacitor is used in high temperatures or in pressurized or evacuated environments. In this embodiment, glass-to-metal hermetic seal is utilized in addition to the previously described seal. This additional seal includes a metallic annular ring 74 having its outer surface connected to the inside of the flange 52 of the disk 36. A metallic tube 76 is disposed around and soldered to the conductor 64 by a suitable soldering material. A glass-like insulating sealing material 78 extends between and is firmly connected to the outer surface of the tube 76 and the inner surface of the annular ring 74 to provide a hermetic seal.

Figure 6:
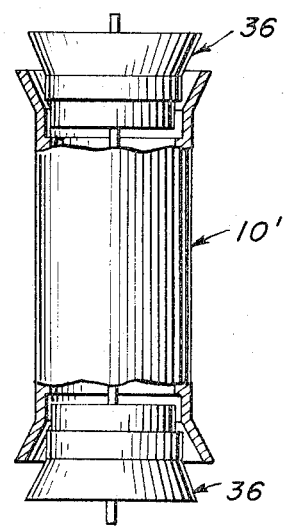

FIGURE 6 shows another embodiment wherein the cylindrical casing 10' is sealed at both of its ends by a seal as described hereinabove.

In FIGURE 7 there is shown another variation wherein two leads 60' each pass through a plug 56 in a disk 36' sealed to the casing 10. The seal is obtained in this structure also as described above.

Because of the over-all simplicity of the seal structure of the present invention, it is possible to utilize a method of partially assemblying it prior to its insertion within the casing 10. In practicing this novel method, the plug 56 is inserted within the enlarged portion 38 of the aperture 40 formed within the disk 36. The aperture defining flange 50 is then directed inwardly against the plug 56 compressing and deforming the plug and forcing its lower portion into the neck 42 of the aperture 40 and causing its upper portion to form the bead 58 over the top of the flange tab 50'. The anode lead 60 which may have been previously suitably attached to an anode 30, around the bottom of which has been placed the spacer 32, is force fitted through the deformed plug 56 to form a dry seal. This assembly, which can be formed automatically and economically in an atmosphere free of contamination, e.g., away from the electrolyte of the capacitor, is inserted into the casing 10. It is positioned so the outer flange 52 contacts the lip 17 of the casing 10. The flange and lip are then sealed, by welding techniques such as, for example, by friction welding, cold pressure-welding, by ultrasonic welding, or by using heliarc welding with heat sink.

It is apparent that within the scope of this invention other substances and other concentrations may be used as an electrolyte. Atlhough the seal has been described in regard to electrolytic capacitors and in regard to the materials used in such devices, it is also apparent that other materials might be used for the seal in practicing the present invention.

From the foregoing, it will be observed that numerous variations and modifications may be effected without departing from the true spirit and scope of the novel concept of the invention. It is, of course, intended to cover by the appended claims all such modifications as fall within the scope of the claims.

I claim:

1. In an electrical device including a casing with an opening therein and with a lead projecting through said opening, a seal structure comprising a closure disk adapted to be disposed within the opening with its peripheral surface adapted to be fused into sealing engagement with the adjacent surface of the casing, a resilient insulative plug adapted to have the lead pass therethrough, said disk including an axial aperture passing therethrough having a reduced neck-end of smaller cross section than that of said insulative plug when uncompressed, said plug being compressed into said aperture, and means formed integrally with said disk and extending around said aperture at the end opposite from said reduced neck-end in pressure exerting engagement with the end surface of said plug for forcing a projection thereof into said neck-end, said plug being maintained in sealing engagement with said lead passing therethrough and with the surface of said disk defining said aperture.

2. A sealed electrical device comprising a casing having an opening therein, a closure disk in said opening having its peripheral surface fused into integral sealing engagement with the adjacent casing surface, said disk including an axial aperture having a reduced neck-end, a resilient insulative plug compressed into said aperture, and an electrical component disposed within said casing having a lead projecting through said opening and said plug, said disk including a flange partially defining said bore at the end opposite from said neck-end and in pressure exerting engagement with a margin on the end surface of said plug forcing a portion of said plug into said neck and maintaining said plug in sealing engagement with said lead and with the surface defining said bore.

3. A device as claimed in claim 2 in which said disk is cold pressure-welded to said casing.

4. A device as claimed in claim 2 in which said disk is ultrasonically welded to said casing.

5. A device as claimed in claim 2 in which said lead is joined to a conductor externally of said flange, in which a projection extends from the junction of said lead and said conductor, and in which a plastic material is disposed on said disk within the periphery of said casing covering said flange, said junction and said projection.

References Cited
UNITED STATES PATENTS

| | | | |
|---|---|---|---|
| 2,957,041 | 10/1960 | Ziegler | 317—230 |
| 3,114,085 | 12/1963 | Ruscetta et al. | 317—230 |
| 3,131,337 | 4/1964 | Clement | 317—230 |
| 3,264,708 | 8/1966 | Diggens | 317—230 |
| 3,289,051 | 11/1966 | Sloan | 317—230 |

JAMES D. KALLAM, *Primary Examiner.*